United States Patent [19]
Hull et al.

[11] Patent Number: 4,967,524
[45] Date of Patent: Nov. 6, 1990

[54] ACCESS VENT

[76] Inventors: Harold L. Hull, 401 Canyon Way Sp. 43, Sparks, Nev. 89431; Fred Bradburn, 500 Mira, Reno, Nev. 89511

[21] Appl. No.: 252,892

[22] Filed: Oct. 3, 1988

[51] Int. Cl.⁵ .................................................. E04B 7/00
[52] U.S. Cl. ....................................... 52/198; 52/256; 52/220; 52/305
[58] Field of Search .................. 4/256; 52/220, 198, 52/208, 305, 302; 285/7, 901; 98/32, 38.6, 42.09, 114; 49/168, 371, 61

[56] References Cited

U.S. PATENT DOCUMENTS

| | | | |
|---|---|---|---|
| 848,759 | 4/1907 | Mern | 285/901 |
| 1,096,278 | 5/1914 | Sutton | 285/901 |
| 1,776,168 | 9/1930 | Sweeley et al. | 52/256 |
| 1,894,930 | 1/1933 | Hueglin | 98/42.09 |
| 2,533,766 | 12/1950 | Caruolo | 52/302 |
| 3,220,079 | 11/1965 | Aggson | 52/302 |
| 3,605,135 | 9/1971 | Tan | 4/256 |
| 3,608,098 | 9/1971 | Andrisani | 4/256 |
| 3,672,630 | 6/1972 | Naumburg et al. | 285/7 |
| 3,935,686 | 2/1976 | Dozois | 52/302 |
| 3,936,892 | 2/1976 | Miller | 4/256 |
| 4,071,267 | 1/1978 | Davis | 52/220 |
| 4,133,347 | 1/1979 | Mercer | 285/901 |
| 4,144,598 | 3/1979 | Li | 4/256 |
| 4,301,629 | 11/1981 | Farr | 52/302 |
| 4,321,712 | 3/1982 | Dixon | 4/256 |
| 4,468,886 | 9/1984 | Tew | 49/61 |
| 4,469,018 | 9/1984 | Taulman | 98/114 |
| 4,796,520 | 1/1989 | Kramer, Jr. | 285/901 |

FOREIGN PATENT DOCUMENTS 484400 6/1952 Canada .

Primary Examiner—David A. Scherbel
Assistant Examiner—Lan Mai

[57] ABSTRACT

A vent or passageway through a structure such as a wall in a motor home or mobile home or the like which is readily accessible by opening a water tight lid or cap hinged to each face plate which exposes a tubular passageway through the wall through which may be passed a garden hose or an electric cord or the like for such purposes as flushing out a holding tank or the like.

6 Claims, 2 Drawing Sheets

U.S. Patent    Nov. 6, 1990    4,967,524
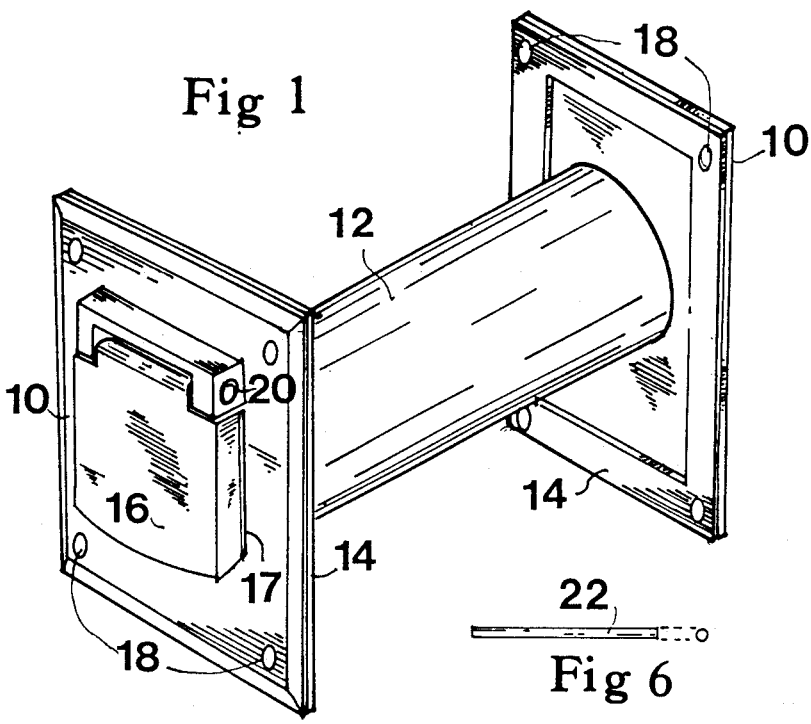
Fig 1
Fig 5
Fig 6
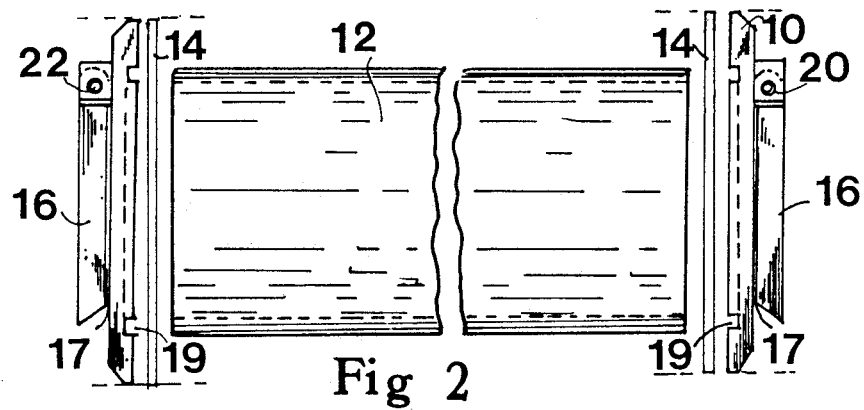
Fig 2
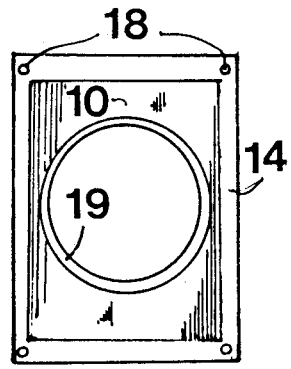
Fig 3
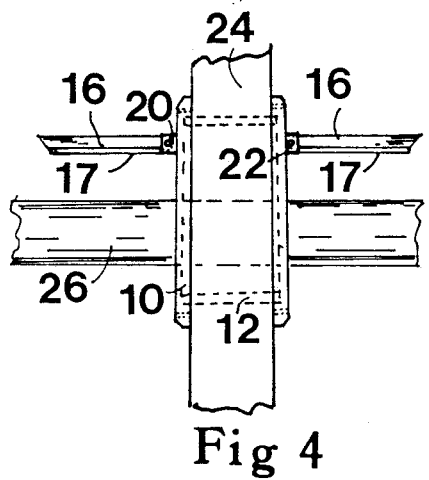
Fig 4

ACCESS VENT

BACKGROUND OF THE INVENTION

This invention relates to creating a passageway through a wall such as a motor home or mobile home through which a water hose or the like may be passed from time to time for the purpose of flushing out holding tanks or the like.

In the past when it became necessary to pass a water hose or electrical drop cord or the like, through the wall of a structure, it has been necessary to pass through the structure by means of a door or window or the like and drag the hose or electrical line across the floor and furniture, etc., to reach the objective such as a holding tank or the like. This results in leaving the door or window open which is unpleasant in cold or rainy weather and also creates confusion by having to go through extra rooms and across furniture or the like which is not only inconvenient but results in bringing in dirt and debris from the hose or the electrical cord or the like.

While the prior art addresses means to vent walls such as air vents in foundations or attic vents, none seem to address the problem directly of providing an access passageway which may be used repeatedly which remains air tight when not in use.

SUMMARY OF THE INVENTION

The present invention provides such a passageway that is sanitary and convenient which may be installed through any wall such as motor homes or mobile homes or the like with simple tools and which remains air and/or water tight when not in use as a passageway.

It is a primary object of the invention to provide an access vent which will readily adapt to any size wall.

It is a further object to provide an access vent which is substantially air and/or water tight when not in use.

It is still a further object to provide an access vent in which the interior and exterior plates, which are a part of the vent, have means which are readily accessible such as a spring-like loaded lid or cap or the like.

Still another object is to provide a passage way tube to connect the two wall plates in a length long enough that it may be cut to fit any thickness of an average wall.

Yet another object is to provide means for said tube to mate with said wall plates in such a manner as to present a smooth surface to the hose or electrical line without any sharp edges or the like for said hose or electrical line to catch on.

Another object is to provide means to keep the caps or lids on said plates in an open position when in use and a closed position when not in use.

Other advantages will become apparent when taken in consideration with the following descriptions and drawings.

BRIEF DESCRIPTION OF THE DRAWINGS

FIG. 1 is a perspective drawing of the access vent.

FIG. 2 is a partially exploded side view of the access vent.

FIG. 3 is a back view of one of the plates.

FIG. 4 is a typical installation showing a garden hose passing through the access vent and the caps or lids in an open position.

FIG. 5 is a rubber grommet or bearing.

FIG. 6 is a pin.

FIG. 7 is a spring.

FIG. 8 is a perspective view of a telescoping vent.

FIG. 9 is a side view of a collapsible accordion tube.

DETAIL DESCRIPTION OF THE DRAWINGS

Referring now to the drawings, 10 is an exterior and interior face plate while 12 is a connecting tube, with 14 being a gasket between the faceplate and the wall, while 16 is a lid or cap, 17 being a gasket for lid 16 while 18 are mounting holes, with 19 being a groove in the back of face plate 10 to accept the end of tube 12 with 20 being a rubber like grommet or bearing for pin 22 with 24 being a typical wall and 26 a garden hose or the like and 28 is a spring, while 30 is a collapsible accordion type tube, and 32 is a telescoping tube.

In application, a hole is cut in the typical wall 24 large enough to accept tube 12 and the end of the tube 12 is now inserted or glued into groove 19 and to the back of one of the plates and inserted into the wall with the excess of tube 12 protruding out the other side of the wall 24. The tube 12 is then marked allowing for the depth of the next groove 19 in the second face plate and said tube is now cut off at the proper length and re-inserted into the wall. The face plate 10 with the tube 12 attached is now affixed to the wall by screws through mounting holes 18 after which the second face plate is affixed or glued to the other end of the tube 12 and affixed to the wall by screws through mounting holes 18.

It will now be readily seen by raising the lids or caps 16 to an open position as shown in FIG. 4 and said caps being retained in an open position by the tension produced by the rubber grommet or bearing on lids or caps 16 that we have provided a passageway through which we may safely and sanitarily pass a garden hose 26 or the like.

It will also be noted that we have provided an access vent which may be readily adapted to any thickness of wall.

It will also be seen that We have provided an access vent which is substantially air and/or water tight when in its closed position.

It will also be noted that we have provided a spring-loaded lid or cap which will stay in any position and makes the access vent readily available.

It is also seen that we have provided an access vent that presents a smooth surface to the object being passed through it.

Although the invention has been herein shown and described in what is conceived to be the most practical and preferred embodiments, it is recognized that departures may be made therefrom within the scope of the invention, which is not to be limited to the details disclosed herein but it is to be accorded the full scope of the claims so as to embrace any and all equivalent devices and apparatus.

Having described our invention, what we claim as new and desire to secure by letters patent is:

We claim:

1. A water hose access vent comprising; An inner and outer face plate, means to affix said face plates to an inner and outer surface of a wall, an opening in said face plates, means to open and close said openings in said face plates, tubular connecting means between said face plates, said tubular connecting means being adjustable to accommodate varied wall thicknesses, whereby, said inner and outer face plates, said openings, said means to open and close said openings and said tubular adjustable connecting means, cooperate together to form an access vent of a size substantially no larger than is necessary to pass a household garden hose through.

2. The device of claim 1 in which the means to affix said face plates to said inner and outer surfaces provides an air and water-tight connection.

3. The device of claim 1 in which said means to open and close said openings in said face plates, is a lid or a cap and said lid or cap having a spring-loaded hinge at one of its extremities.

4. The device of claim 3 in which said hinge for said lid or cap is a pin, said pin being mounted in bearings.

5. The device of claim 1 in which said tubular adjustable connecting means is telescopic.

6. The device of claim 1 in which said tubular adjustable connecting means is a collapsible accordion tube.

* * * * *